Feb. 10, 1970    M. DAIGNAS    3,494,511
PORTABLE MOTOR-DRIVEN COATING MACHINES
Filed June 1, 1967    2 Sheets-Sheet 1
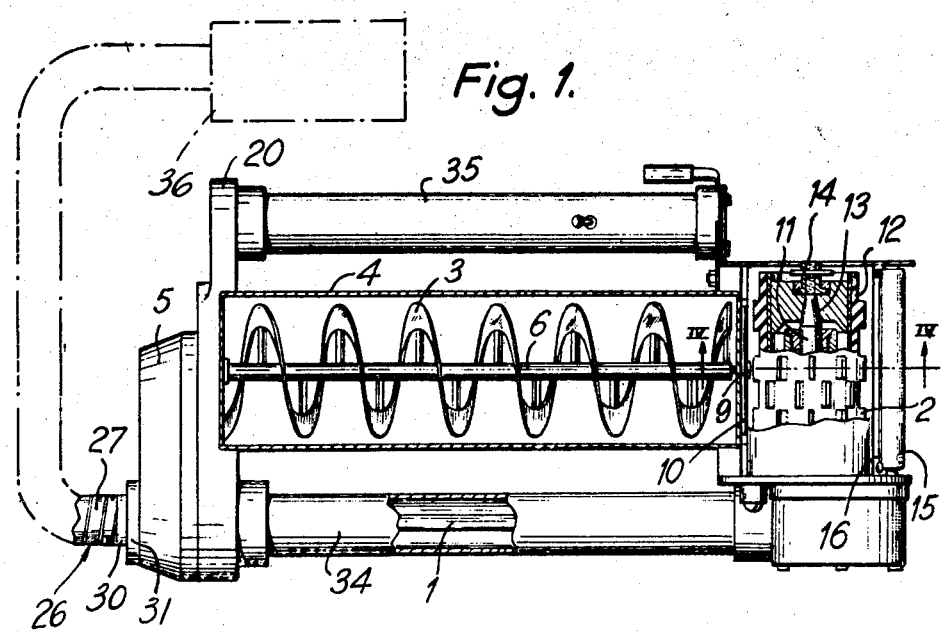
Fig. 1.
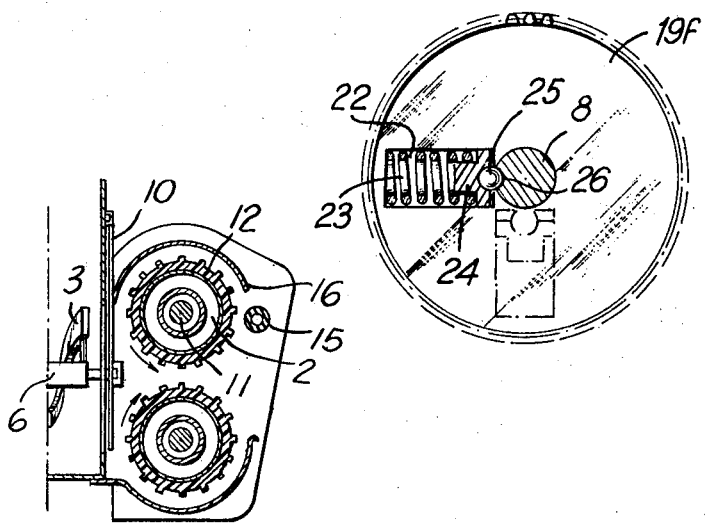
Fig. 3.
Fig. 4.

3,494,511
PORTABLE MOTOR-DRIVEN COATING MACHINES
Michel Daignas, 10 Rue Boissy d'Anglas, Nice, France
Filed June 1, 1967, Ser. No. 642,782
Claims priority, application France, June 2, 1966,
63,824
Int. Cl. G01f 11/20
U.S. Cl. 222—236                                    9 Claims

ABSTRACT OF THE DISCLOSURE

A portable coating machine for supplying a coating material contained in a hollow body acting as a reservoir and having a cylindrical bottom wall forming a trough for said reservoir and a front wall with an aperture centered on the axis of said cylindrical trough. A rotatable screw conveyor has a shaft coaxial with, and housed within, the cylindrical trough for conveying the coating material from said trough to a gap formed between two centrifugal, superposed, projection rotors extending at right angles to the trough axis and rotatable in opposite directions. A motor drives a single transmission shaft which in turn drives the screw conveyor via a spring loaded slip clutch, and both rotors.

---

This invention relates to portable coating machines powered by a motor which may be either an incorporated electric motor or a remotely-located motor of any convenient type and which, through a single main transmission shaft, simultaneously drives, on the one hand, two centrifugal projection rotors rotating in opposite directions in spaced mutual relationship and, on the other a hollow worm for conveying the material—mortar for example—from the reservoir containing it into the space between the two rotors.

In some machines of this kind the feed worm is driven by the main transmission shaft through a speed reduction mechanism which comprises a first right-angle drive consisting of a worm gear and a gearwheel with helical teeth and a second right-angle drive consisting of two bevel pinions. In practice, however, such reduction gears lack durability, the worm gear and the helical gearwheel being the seat of extremely rapid wear.

The present invention accordingly relates to an improved machine of this kind which includes a train of involute spur reduction gears between the feed worm and the main transmission shaft.

Machines of the aforesaid type sometimes include a safety grid positioned between the worm and the rotors, the function of which is to modify the output of the machine and prevent material other than the mortar from passing (e.g. material of abnormal size such as pebbles or waste conglomerates) liable to damage the rotors. Although such an arrangement will safeguard the rotors, it will not protect the feed worm, which may be damaged through such extraneous matter clogging its trough.

It is an object of the present invention to mitigate this drawback and to provide an improved machine of this kind which comprises means for automatically disconnecting the shaft driving the worm spindle from the transmission driving the shaft.

In a preferred form of embodiment, such disconnecting means is provided between the worm driving shaft and the final gearwheel driven by the transmission and consists of a ball which protrudes into the bore of the gearwheel and engages in a recess formed on the shaft, said ball being retractable through compression of a spring.

Further, since it is compulsory to take great precautions with portable tools of this kind driven by electric motors, the subject machine of the present invention preferably comprises insulated connecting means to the drive motor. The machine may further include insulated handles, notably in the case of the handle containing the switch and the rubber-covered lead to the motor.

The description which follows with reference to the accompanying non-limitative exemplary drawings will give a clear understanding of how the invention can be carried into practice.

In the drawings:

FIGURE 1 shows in plan view with partial cutaway a machine according to the present invention with its enclosure removed.

FIGURE 3 is a side view of the gearwheel embodying the drive release device according to the invention.

FIGURE 4 is a sectional view taken on lines IV—IV of FIG. 1.

Figure 2:
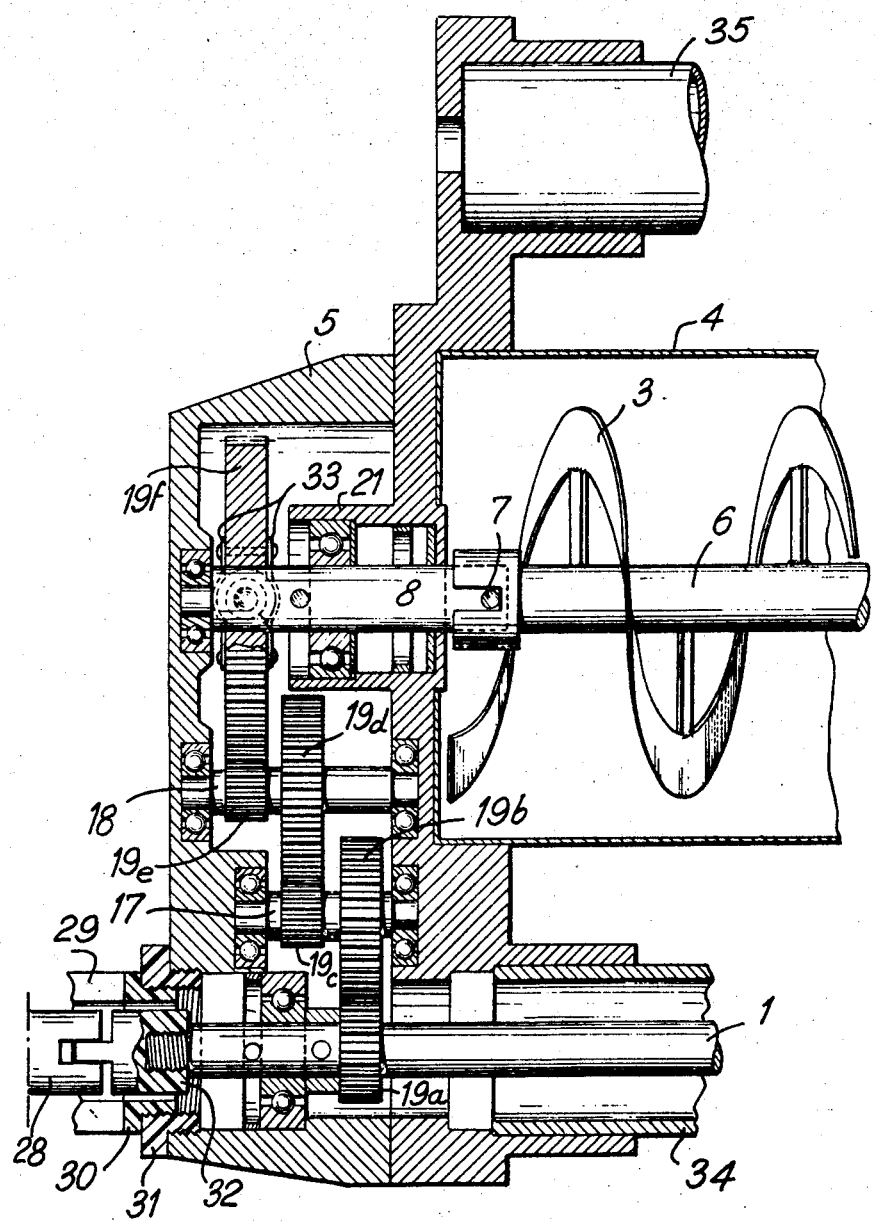
FIGURE 2 is a parital showing in planform of a section taken through the plane containing the axis of the drive shaft and the worm of the machine in FIGURE 1.

The machine shown in FIGURE 1 includes a main transmission shaft 1 which simultaneously drives two centrifugal projection rotors 2 positioned one above the other and rotating in opposite direction in mutually spaced relationship. The machine further includes a hollow worm 3 arranged inside a trough 4 placed at the bottom of a reservoir, which worm conveys the material contained in the tank to a space between the two rotors 2.

Hollow worm 3 consists of a metallic strip whose width increases from the side adjacent the worm transmission casing 5 up to the side adjacent the rotors; it is wound in helix fashion about a shaft 6 in spaced relationship therewith. Shaft 6 is connected by a bayonet-type coupling device 7 (FIGURE 2) to the output shaft 8 of the worm drive transmission. Adjacent the rotors, shaft 6 is located in an elastic bearing adapted to pivot about a horizontal transverse spindle 9. Between the rotors and the exit from the feed worm is positioned a safety grid 10 which acts as a recovery device, performs a sieving function and adjustment of the output, and may possibly include a central screen.

Main transmission shaft 1 carries a helical gear meshing with two further helical gears which are set at right angles to the first mentioned gear and are rigidly united, respectively, with the drive shafts 11 of rotors 2. These rotors carry an external lining 12 made of a flexible material formed with longitudinal sets of staggered teeth and longitudinal and diametrical hollows therebetween. Each rotor is centered upon its associated shaft 11 by a taper bearing 13 and is associated with an extractor 14 operating in the manner of a hub extractor. Further, a crowding inhibitor and material recovery roll 15 is positioned in front of upper rotor 2, below the level of the axis thereof, and is driven in a direction opposite this rotor by a train of reduction gears driven by transmission shaft 1. Roll 15 is associated with a flexible scraper blade placed between it and the rotor, and a further crowding inhibiting and material recovery blade 16 is located in front of the lower rotor, at a level higher than the axis thereof.

In order to permit vertical projections, the tank containing the worm is covered by a lid of shape matching that of trough 4, and this lid is fitted with a handle and its movements are facilitated by transverse and longitudinal rollers mounted thereon.

The train of speed reduction gears shown in FIGURE 2 enables the rotation of shaft 1 to be transmitted to the output shaft 8 which is parallel thereto and drivingly connected to worm shaft 6. This gear train accordingly includes two intermediate shafts 17 and 18 parallel to shafts 1 and 8, and involute spur gears 19a to 19f of module equal to unity. Driving wheel 19a is keyed to shaft 1, wheels 19b and 19c to shaft 17, wheels 19d and 19e to shaft 18 and driven wheel 19f to shaft 8. Gearwheel 19a has twenty teeth and meshes with wheel 19b which has thirty teeth; wheel 19c has twelve teeth and meshes with wheel 19d which has thirty-five teeth; and wheel 19e has twelve teeth and meshes with wheel 19f which has sixty teeth. Consequently, this train of gears rotates shaft 6 at about $\frac{1}{22}$ the rotation speed of drive shaft 1.

The train of reduction gears is housed in a pan-shaped casing 5 secured to the side of the machine frame 20, perpendicular to shafts 1 and 6. Both ends of each of shafts 17 and 18 are formed with journals carried in ball-bearings which are mounted in housings provided, on one side, in the bottom of the casing and, on the other side, in the machine frame. The end of shaft 8 remote from that coupled to shaft 6 is likewise formed with a journal similarly supported in the casing, and this shaft 8 is additionally supported, between wheel 19f and bayonet coupling 7, by a further ball-bearing contained in a housing 21 projecting from the machine frame into casing 5. Similarly, shaft 1 is supported between wheel 19a and its end proximate the motor drive by a ball-bearing housed in casing 5. The two latter-mentioned ball-bearings are restrained laterally by linchpins. This arrangement of ball-bearings and journals is thus effective in locating and guiding the gear spindles.

The drive release device shown in FIGURES 2 and 3 is positioned between shaft 8 and gearwheel 19f which is loosely mounted on shaft 8. Gearwheel 19f has bored thereinto a radial housing which opens at one end into the central bore of the wheel and intersects each side of gearwheel 19f to form rectangular openings 22 therein. This housing contains a coil spring 23 which reacts against the blind end of the housing, adjacent the periphery of wheel 19f; it also contains a supporting element 24 adapted to receive a ball 25 which is caused to project into the central bore of wheel 19f responsively to the spring 23 acting against element 24. This ball is adapted to cooperate with a spherical indent 26 formed on shaft 8, which shaft extends through gearwheel 19f. The spring and the ball are retained within the body of gearwheel 19f by two small plates 33 made of thin sheetmetal and fixed to opposite sides of gearwheel 19f.

Thus, in normal operation, the ball maintains gearwheel 19f in coupled relation with shaft 8 under the action of its incorporated spring 23. Should the feed worm become accidentally jammed, however, the ball driven by gearwheel 19f will ride out of the indent on shaft 8 by compressing spring 23 and will revolve as a satellite with wheel 19f, around shaft 8, in the position shown in dot-dash lines in FIGURE 3. Stopping the rotation of feed worm 3 consequently in no way affects rotation of main drive shaft 1: no further projection of material takes place and the motor can be stopped and the machine emptied by turning it upside down so as to disengage the object fouling the worm.

FIGURES 1 and 2 also illustrate the coupling and insulating arrangement between the machine and the electric motor 36 driving it. This device includes a flexible drive 27 (see FIGURE 1) consisting of a flexible core 28 and sheath 29. The end of sheath 29 is fitted with a threaded tubular ferrule 30 which can be screwed into a nut 31, which nut is in turn permanently screwed into a bore formed at the bottom of casing 5 through which the end of shaft 1 extends. Shaft 1 has its end rigidly connected to a tubular drive stub 32 formed with a tongue capable of engaging a matching slot formed on the end of flexible transmission core 28.

Ferrule 30, nut 31 and stub 32 are made of any convenient insulating material such as nylon, thereby ensuring complete insulation between the transmission core and sheath, on the one hand, and the main shaft and reduction gear casing of the machine, on the other.

The handles 34 and 35 are likewise made of insulating material.

It goes without saying that many changes and substitutions of parts may be made to the exemplary form of embodiment hereinbefore described without departing from the spirit and scope of the invention.

What I claim is:

1. A portable coating machine for supplying a coating material, said machine comprising: a hollow body constituting a reservoir for coating material and having a cylindrical bottom wall forming a trough and a front wall with an outlet aperture on the axis of said cylindrical bottom wall of said trough, two handles secured on either side of said hollow body, two centrifugal, superposed, projection rotors having axes which are at right angles to the axis of the trough, said rotors being rotatable in opposite directions and being mounted on said body adjacent said front wall to define between the rotors a gap at the level of the trough axis, a rotatable screw conveyor in said trough and having a shaft coaxial with the axis of the trough for conveying the coating material from said trough to said rotors and the gap therebetween, a remote motor means, a single transmission shaft, elongated flexible means for drivingly connecting said motor means and said transmission shaft, driving means for connecting said transmission shaft to said screw conveyor and means for drivingly connecting said transmission shaft to both rotors.

2. A machine as claimed in claim 1 wherein said driving means comprises a train of involute spur reduction gears connecting said transmission shaft to said screw conveyor.

3. A machine as claimed in claim 1 comprising means for automatically disconnecting said screw conveyor from said driving means when said screw conveyor becomes jammed.

4. A machine as claimed in claim 3 wherein said driving means connecting said transmission shaft and said screw conveyor comprises a driven wheel loosely mounted on the shaft of the screw conveyor and said means for automatically disconnecting said screw conveyor from said driving means comprises a spring-loaded ball supported by said driven wheel and engaged in a detent provided in said shaft, said ball being urged from said detent against its spring loading when the conveyor is jammed whereby the screw conveyor is disconnected from said driving means.

5. A machine as claimed in claim 4 wherein said spring-loaded ball comprises a ball member and a spring acting on said ball member, said driven wheel having a slot which is open to said shaft and which forms a housing for said ball member and spring.

6. A machine as claimed in claim 1, said means for drivingly connecting said motor means and said transmission shaft comprises a flexible cable having a core portion and a sheath portion, said sheath portion having two ends and being secured at one of said ends to said motor and at the other of said ends to said body at one end of said transmission shaft, said core portion having two ends and being drivingly connected to one of said ends with said motor and at the other of said ends with said one end of said transmission shaft.

7. A machine as claimed in claim 6 wherein said means for drivingly connecting said motor means and said transmission shaft further comprises insulating means between said core portion and the transmission shaft and between said sheath portion and said body.

8. A machine as claimed in claim 7 wherein said insulating means between said core portion and the transmission shaft comprises an insulated drive stub on said transmission shaft, said stub including a tongue engaging said core portion, said insulating means between said sheath portion and said body comprising an insulated ferrule on said sheath portion in threaded engagement in said nut.

9. A machine as claimed in claim 1 wherein said handles are constituted of insulating material.

(References on following page)

References Cited

UNITED STATES PATENTS

| | | | |
|---|---|---|---|
| 1,360,778 | 11/1920 | Neel | 64—4 X |
| 1,391,092 | 9/1921 | Beach | 64—4 |
| 2,380,499 | 7/1945 | Brend | 118—321 X |
| 2,625,905 | 1/1953 | Richards | 118—320 |
| 3,047,237 | 7/1962 | Tambolleo | 239—215 |
| 3,305,058 | 2/1967 | Orwin et al. | 64—29 X |
| 2,707,068 | 4/1955 | Williamson | 239—652 X |
| 2,740,230 | 4/1956 | Clapper | 239—653 X |
| 3,059,862 | 10/1962 | Rich | 103—5 X |
| 3,159,315 | 12/1964 | Friesen | 103—5 X |
| 3,322,429 | 5/1967 | Cervelli | 239—675 X |
| 1,306,513 | 6/1919 | Aurand | 198—232 |
| 2,528,679 | 11/1950 | Ballard et al. | 198—213 |
| 2,670,880 | 3/1954 | Ajero | 222—272 |
| 2,966,698 | 1/1961 | Thielen | 222—411 X |

ROBERT B. REEVES, Primary Examiner

N. M. STACK, JR., Assistant Examiner

U.S. Cl. X.R.

222—281, 466